(12) United States Patent
Lubowicki et al.

(10) Patent No.: US 8,151,696 B2
(45) Date of Patent: Apr. 10, 2012

(54) MOLD FOR PRODUCING A BATTER-BASED FOOD THAT SWELLS UNDER HEAT

(75) Inventors: Jean-Pierre Lubowicki, Gruffy (FR); Rodolphe Touchard, Rumilly (FR)

(73) Assignee: SEB SA (FR)

( * ) Notice: Subject to any disclaimer, the term of this patent is extended or adjusted under 35 U.S.C. 154(b) by 605 days.

(21) Appl. No.: 12/331,007

(22) Filed: Dec. 9, 2008

(65) Prior Publication Data

US 2009/0145307 A1 Jun. 11, 2009

(30) Foreign Application Priority Data

Dec. 10, 2007 (FR) .................................. 07 59702

(51) Int. Cl.
*A47J 37/06* (2006.01)
(52) U.S. Cl. ........................................... 99/375; 99/446
(58) Field of Classification Search ................... 99/372, 99/375, 376, 380, 444, 446
See application file for complete search history.

(56) References Cited

U.S. PATENT DOCUMENTS

| 5,937,742 | A | 8/1999 | Steeb et al. ............... 99/375 |
| 2006/0201333 | A1 | 9/2006 | Friel, Sr. et al. ............ 99/372 |
| 2008/0178746 | A1* | 7/2008 | Rosset et al. .............. 99/380 |
| 2008/0245241 | A1* | 10/2008 | Rosset et al. .............. 99/375 |

FOREIGN PATENT DOCUMENTS

| BE | 483 329 | 7/1948 |
| CN | 2211224 | 11/1995 |
| DE | 28 32 088 | 1/1980 |
| DE | 4031218 C1 * | 4/1992 |
| FR | 2 877 545 | 5/2006 |

OTHER PUBLICATIONS

Rapport De Recherche Préliminaire of French Application No. 0759702 mailed Aug. 4, 2008, 2 pages.

* cited by examiner

*Primary Examiner* — Stephen F Gerrity
(74) *Attorney, Agent, or Firm* — Seyfarth Shaw LLP

(57) ABSTRACT

The invention relates to a mold (1) for producing a batter-based food that swells under heat, which mold (1) comprises two cooking subassemblies (2, 3) capable of moving between an open position enabling the batter to be deposited and a closed position in which they define a cooking chamber, in which each cooking subassembly (2, 3) includes a cooking plate (4, 5), with the lower cooking plate (4) comprising a peripheral wall that delimits the cooking chamber and extends above the median plane of said chamber. According to the invention, the peripheral wall includes, on a discharge portion (11), a lowering forming an opening enabling an excess of expanding batter to be discharged, in which the discharge portion (11) extends vertically at least to the median plane of the cooking chamber.

16 Claims, 2 Drawing Sheets

MOLD FOR PRODUCING A BATTER-BASED FOOD THAT SWELLS UNDER HEAT

FIELD

This invention relates to a mold for producing a batter-based food that swells under heat, i.e. primarily a waffle maker, and alternatively a doughnut maker.

Such a mold comprising two cooking subassemblies capable of moving one with respect to the other between an open position enabling the batter to be deposited and the cooked food to be removed, and a closed position in which they define a cooking chamber, each cooking subassembly including a cooking plate that gives its shape to the food obtained by cooking the batter, the lower cooking plate comprising a peripheral wall that peripherally delimits the cooking chamber and that extends vertically beyond the median plane of said chamber, is known.

Such a peripheral wall is intended to prevent the batter from overflowing when an excessive amount has been deposited. However, the pressure exerted by the expansion of the batter and by the vapor generated by the cooking of said batter nevertheless causes an overflow, and this is aggravated by the fact that the vapor tends to accumulate in the top portion of the cooking chamber, thus preventing the batter from occupying said space and forcing it to escape, which results in poorly shaped food (the upper face being low in batter). The overflow occurs at the entire periphery of the mold, which causes a certain aesthetic defect, and this excess of batter is eventually cooked in place (not only on the cooking plate which is normally coated with an anti-adhesive material, but also on the shell), which then requires additional thorough cleaning.

This invention is intended to provide a mold without the aforementioned disadvantages.

SUMMARY

According to the invention, the peripheral wall of the aforementioned type of mold includes, on a discharge portion, a lowering forming a discharge opening enabling the excess of expanding batter to be discharged, with the lowered peripheral wall extending at the level of or above the median plane of the cooking chamber.

Thus, according to the invention, the overflow of batter is controlled: due to the presence of the lowering, the batter escapes from the cooking chamber only by this opening. It is thus possible to choose the location where the overflow will occur and, therefore, to attenuate the visual impact, facilitate cleaning in this location by depositing an anti-adhesive coating, and so on.

BRIEF DESCRIPTION OF THE DRAWINGS

Other special features and advantages of this invention will appear in the description of an embodiment given by way of a non-limiting example illustrated by the appended drawings, in which.

DETAILED DESCRIPTION

Figure 1:
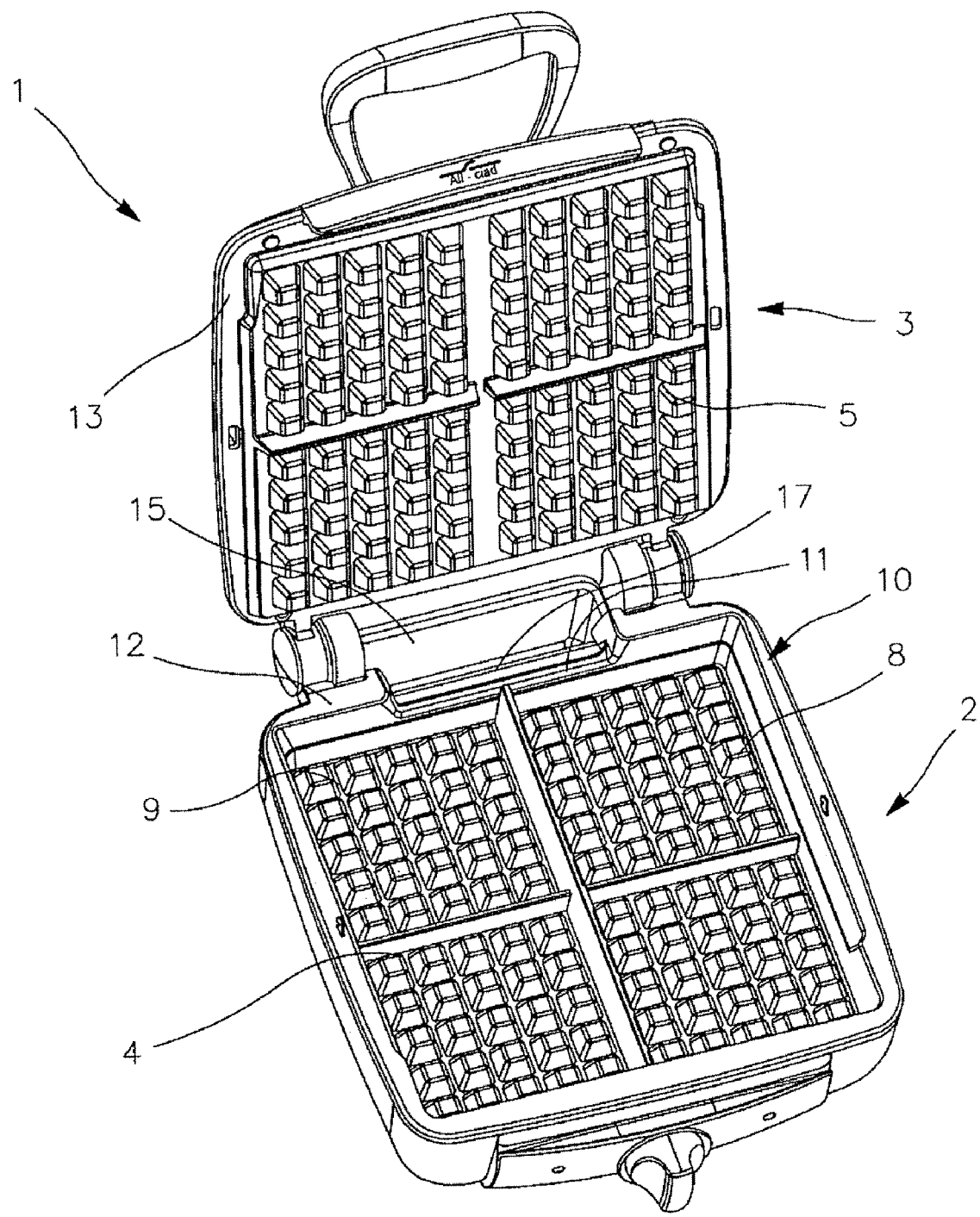
FIG. 1 is a perspective view, from above, of an open waffle maker.

As shown in FIG. 1, a mold 1 for producing a batter-based food that swells under heat (in this case a waffle maker 1) comprises two cooking subassemblies 2, 3 mobile with respect to one another: a lower subassembly 2 and an upper subassembly 3. The two cooking subassemblies 2, 3 are linked by a hinge between an open position enabling the batter to be deposited and the removal of the cooked food, and a closed position in which they define a cooking chamber.

Each cooking subassembly 2, 3 includes a cooking plate 4, 5 that cooks the batter and gives its shape to the food obtained by said cooking, and a shell 6, 7 that forms the external casing of the subassembly 2, 3 and that comprises an opening in which the corresponding cooking plate 4, 5 is mounted. In this embodiment, due to the nature of the mold 1, each cooking plate 4, 5 includes teeth 8 separated from one another by grooves 9.

The lower cooking plate 4 comprises a peripheral wall 10 that peripherally delimits the cooking chamber, and that extends vertically beyond the median plane of the chamber (more specifically, beyond the median plane of the cooking chamber when the two subassemblies 2, 3 are in the closed position, without batter). The peripheral wall 10 includes, on a discharge portion 11, a lowering forming a discharge opening 30 enabling an excess of expanding batter to be discharged, with the lowered peripheral wall extending at least to the median plane of the cooking chamber. Thus, the peripheral wall 10 includes at least one (in this case, one) discharge portion 11 where it has a reduced height, and a holding portion 12 where it has its normal height.

Figure 2:
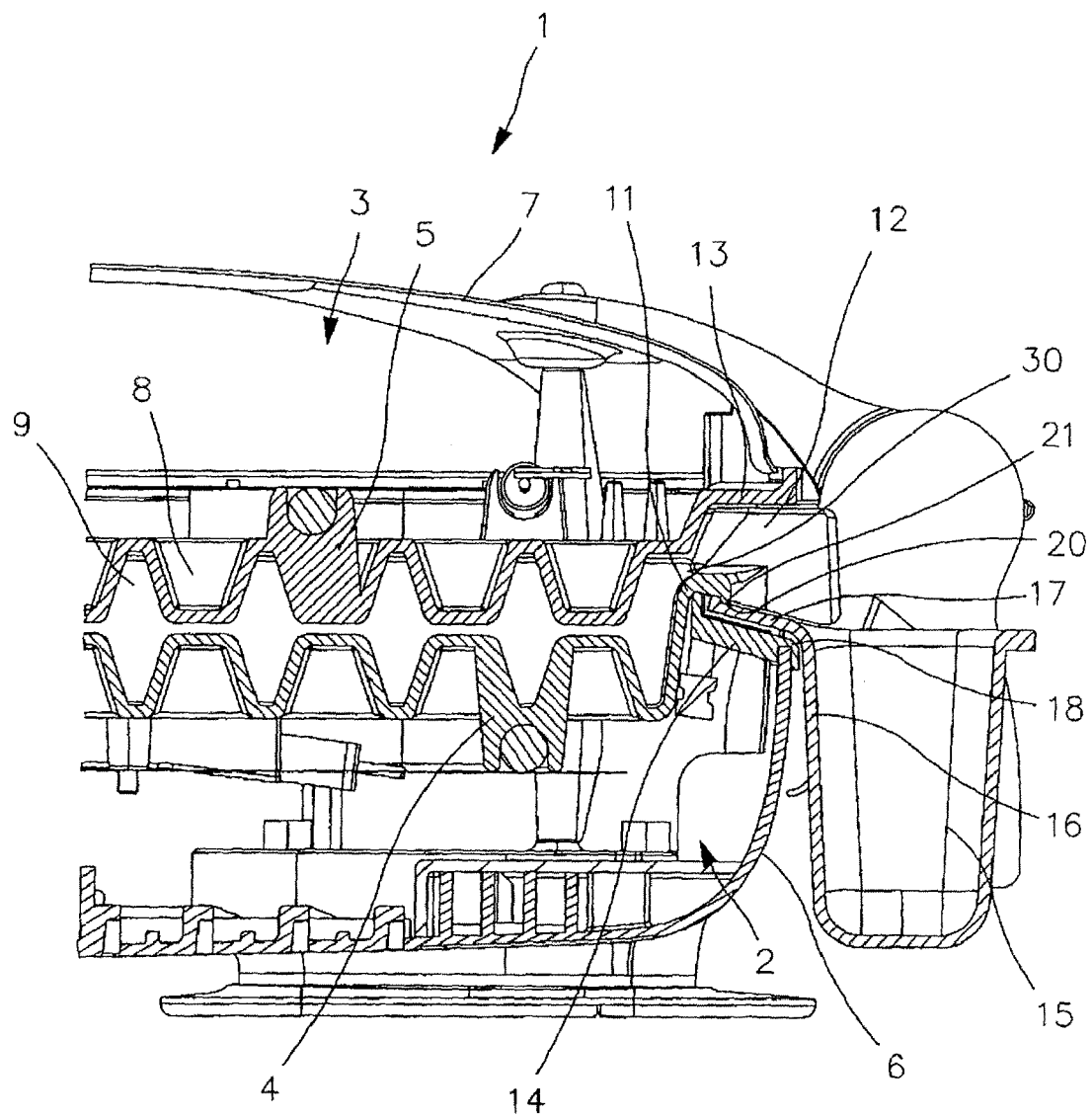
FIG. 2 is a cross-section view of the rear portion of the waffle maker of FIG. 1, closed.

In this embodiment, as shown in FIG. 2, the peripheral wall 10, aside from the discharge portion 11 (i.e. the holding portion 12), reaches at least the level of the base plane of the upper cooking plate 5 (when the mold 1 is in its closed position, without batter); for a waffle maker, the base plane corresponds to the plane defined by the base of the grooves 9. In this case, the upper cooking plate 5 includes a peripheral indentation 13, and the holding portion 12 of the peripheral wall 10 extends to this indentation 13 (the closed position, without batter, is defined by the resting of the peripheral indentation 13 of the upper cooking plate 5 on the holding portion 12 of the peripheral wall 10 of the lower cooking plate 4).

The discharge portion 11 of the peripheral wall 10 reaches a level closer to the base plane of the upper cooking plane 5 than the median plane (when the mold 1 is in its closed position, without batter). In this case, the discharge portion 11 reaches a level equal to at least the mid-height of the teeth 8 of the upper cooking plate 5.

Thus, the excess of batter that is pushed outside of the cooking chamber is done so via the discharge portion, thereby considerably limiting the disadvantages associated with batter overflow. Moreover, in this embodiment, given that, owing to its configuration, the discharge opening 30 extends vertically to the base plane of the upper cooking plate 5 (cf. FIG. 2), the vapor is not trapped in the top portion of the cooking chamber, but instead can freely escape from it and therefore enable the grooves 9 of the upper cooking plate 5 to be properly filled.

To facilitate the discharge of the batter, which has a certain viscosity, it is preferable for the discharge portion 11 to be relatively important, between 10% and 25% of the peripheral wall 10, and preferably around one-eighth of the peripheral wall (around half of one side of the lower cooking plate).

To limit the visual impact of the overflow, it is preferable for the discharge portion 11 to be located on the side of the mold 1 where the link is located (in this case, the hinge).

In addition, in this embodiment, when the upper cooking plate 5 covers the entire upper shell 7 (blocking off the entire opening defined by this shell 7), the lower cooking plate 4 covers the entire lower shell 6, except at the level of the discharge portion 11, where a protective surface 14, secured to the shell 6, performs this function. This protective surface 14 prevents any excess of batter passing through the discharge opening 11 from entering the lower cooking subassembly 2 (between the shell 6 and the peripheral wall 10, which, in this embodiment, is indented in the cooking chamber at the level of the discharge portion 11).

In addition, to recover the excess of batter, in this embodiment, the mold 1 includes a recovery dish 15 that is arranged outside of the cooking chamber, in the extension of the discharge portion 11. To facilitate the flow of the batter into the dish 15 (and therefore to prevent the discharge opening 11 from being blocked), the side 16 of the dish 15 that is adjacent to the discharge portion 11 has a length equal (or substantially equal) to that of the discharge portion 11. For the same purpose, the recovery dish 15 includes a covering edge 17 that extends from the side 16 adjacent to the discharge portion 11 and that reaches the discharge portion 11 of the peripheral wall 10.

The recovery dish 15 is, in this embodiment, separable from the lower cooking subassembly 2. It is attached to it by the covering edge 17. This attachment is achieved by the projection of the covering edge 17 between its contact on the upper edge 18 of the protective surface 14 (itself in contact with the lower shell 6) and its attachment under the free end of the discharge portion 11 of the cooking plate 10 (more specifically, the free end of the covering edge 17 includes an immobilization groove 20 in which a falling edge 21 of the free end of the discharge portion 11 is housed). It should be noted that, when the dish 15 is secured to the lower cooking subassembly 2, the covering edge 17 covers the protective surface 14 (it therefore performs the same function as the latter). In addition, to limit the heat transfer to the batter in the recovery dish 15, the covering edge 17 is long enough and is made (like the rest of the dish 15) of a suitable material resistant to heat transfer (for example a plastic material).

In use, after having arranged the batter on the lower cooking plate 4 and closed the upper subassembly 3, the batter begins to cook by expanding and the vapor escapes. Due to the pressure, on the one hand, the air and the vapor escape from the cooking chamber via the discharge opening 30, which enables the batter to occupy the entire cooking chamber and therefore enables a waffle to be obtained with a constant and uniformly cooked upper surface, and on the other hand, the excess of batter also escapes through this same opening, which leaves the rest of the waffle maker neat and clean. Moreover, given that the covering edge 17 is cold (due to its distance from the resistors) and is tilted downward toward the recovery dish 15, the batter enters the latter in a relatively fluid manner (and therefore without obstructing it). Advantageously, the volume of the recovery dish 15 may enable an excess of batter to be collected so that four or five waffles, or even a dozen can be produced.

Moreover, the discharge opening 30 is a means for accessing a tool (for example, a knife or a spatula) in order to raise and dislodge the cooked food that is otherwise difficult to access due to the height of the holding portion 12 of the peripheral wall 10.

At the end of use, the dish 15 is detached and cleaned (which can be facilitated by the use of suitable materials, such as plastic). It is also particularly easy to put it back in place by inserting it downwards under the lower cooking plate, with its weight ensuring its stability.

This invention is not limited to the embodiment described, as the means for attaching the recovery dish may be, for example, snap-on means or hooks. The dish may also have a square rather than a rectangular cross-section, with the length of the opening thus preferably being adapted. Also, the peripheral wall may include more than one discharge portion.

The invention claimed is:

1. Mold (1) for producing a batter-based food that swells under heat, which mold (1) comprises two cooking subassemblies (2, 3) capable of moving one with respect to the other between an open position enabling the batter to be deposited and the cooked food to be removed, and a closed position in which the subassemblies define a cooking chamber, the two cooking subassemblies (2, 3) including a lower cooking plate (4) and an upper cooking plate (5) that each gives shape to food obtained by cooking the batter, the lower cooking plate (4) comprising a peripheral wall (10) that peripherally delimits the cooking chamber, that extends vertically beyond a median plane of said chamber, and that includes, on a discharge portion (11), a lowered peripheral wall forming a discharge opening (30) enabling an excess of expanding batter to be discharged, characterized in that the discharge portion (11) of the peripheral wall (10) reaches a level closer to a base plane of the upper cooking plate (5) than to the median plane of the cooking chamber.

2. Mold (1) according to claim 1, characterized in that the discharge portion (11) is located on a side of the mold (1) where an articulation between the two cooking subassemblies (2, 3) is located.

3. Mold (1) according to claim 1, characterized in that the discharge portion (11) corresponds to between 10 and 25% of a perimeter of the peripheral wall (10).

4. Mold (1) according to claim 1, characterized in that the peripheral wall (10), aside from the discharge portion (11), reaches the level of the base plane of the upper cooking plate (5).

5. Mold (1) according to claim 1, characterized in that the discharge opening (30) extends vertically to the base plane of the upper cooking plate (5).

6. Mold (1) according to claim 1, characterized in that the mold forms a waffle maker (1) of which each cooking plate (4, 5) includes teeth (8) separated from one another by grooves (9).

7. Mold (1) according to claim 6, characterized in that the peripheral wall (10), aside from the discharge portion (11), reaches at least the level of bases of the grooves (9) of the upper cooking plate (5).

8. Mold (1) according to claim 6, characterized in that the discharge portion (11) of the peripheral wall (10) reaches a level equal to at least mid-height of the teeth (8) of the upper cooking plate (5).

9. Mold (1) according to claim 1, characterized in that the mold (1) includes a batter recovery dish (15) arranged outside of the cooking chamber, in an extension of the discharge portion (11).

10. Mold (1) according to claim 9, characterized in that the recovery dish (15) is removable.

11. Mold (1) according to claim 10, characterized in that the recovery dish (15) includes a covering edge (17) extending from one side (16) that is adjacent to the discharge portion (11) and reaching the latter.

12. Mold (1) according to claim 11, characterized in that the covering edge (17) forms means for attachment of the recovery dish (15) to a lower subassembly (2) by a projection of said covering edge between a contact of said covering edge on a lower shell (6) and an attachment of said covering edge under the discharge portion (11).

13. Mold (1) according to claim 12, characterized in that the covering edge (17) includes an immobilization groove (20) in which a falling edge (21) of the discharge portion (11) is housed.

14. Mold (1) according to claim 1, characterized in that the discharge portion (11), corresponds to one-eighth of a perimeter of the peripheral wall (10).

15. Mold (1) for producing a batter-based food that swells under heat, comprising:
- a lower subassembly (2) and an upper subassembly (3) capable of moving one with respect to the other between an open position enabling the batter to be deposited and the cooked food to be removed, and a closed position in which the subassemblies define a cooking chamber, said lower subassembly including a discharge portion (11), and
- a removable batter recovery dish (15) arranged outside of the cooking chamber, said recovery dish (15) including a covering edge (17) extending from one side (16) adjacent to the discharge portion (11), the covering edge (17) forming means for removable attachment of the recovery dish (15) to the lower subassembly (2) by a projection of said covering edge between a contact of said covering edge on a lower shell (6) and an attachment of said covering edge under the discharge portion (11).

16. Mold (1) for producing a batter-based food that swells under heat, comprising:
- a lower subassembly (2) and an upper subassembly (3) capable of moving one with respect to the other between an open position enabling the batter to be deposited and the cooked food to be removed, and a closed position in which the subassemblies define a cooking chamber, said lower subassembly including a discharge portion (11), and
- a batter recovery dish (15) arranged outside of the cooking chamber, said recovery dish (15) including a covering edge (17) in communication with the discharge portion (11) wherein the covering edge (17) is tilted downward toward the recovery dish (15), so that batter in excess can flow from the discharge portion (11) to the recovery dish along said tilted covering edge.

* * * * *